(12) United States Patent
Hirota et al.

(10) Patent No.: US 9,387,883 B2
(45) Date of Patent: Jul. 12, 2016

(54) VEHICLE FRONT PORTION STRUCTURE

(71) Applicant: TOYOTA JIDOSHA KABUSHIKI KAISHA, Toyota-shi (JP)

(72) Inventors: Akihiro Hirota, Toyota (JP); Masakazu Shirooka, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 14/658,807

(22) Filed: Mar. 16, 2015

(65) Prior Publication Data

US 2015/0307134 A1    Oct. 29, 2015

(30) Foreign Application Priority Data

Apr. 25, 2014   (JP) ................................ 2014-091550

(51) Int. Cl.
*B62D 21/15*   (2006.01)
*B62D 25/08*   (2006.01)

(52) U.S. Cl.
CPC ............ *B62D 21/152* (2013.01); *B62D 25/082* (2013.01)

(58) Field of Classification Search
CPC ...... B62D 25/08; B62D 25/082; B62D 21/15; B62D 21/152
USPC ................ 296/187.09, 187.1, 203.02, 193.09
See application file for complete search history.

(56) References Cited

U.S. PATENT DOCUMENTS

| | | | | | |
|---|---|---|---|---|---|
| 5,984,403 A * | 11/1999 | Kuroda | ................ | B62D 21/152 | 280/784 |
| 6,152,521 A * | 11/2000 | Hayashi | ............... | B62D 21/152 | 296/187.09 |
| 6,695,393 B1 * | 2/2004 | Aouadi | ................ | B62D 21/152 | 296/187.09 |
| 6,908,146 B2 * | 6/2005 | Tomita | ............... | B62D 25/2018 | 296/187.09 |
| 7,165,805 B2 * | 1/2007 | Miyata | ............... | B62D 25/2018 | 296/187.09 |
| 7,651,155 B2 * | 1/2010 | Tan | ........................ | B60R 19/34 | 293/133 |
| 8,118,349 B2 * | 2/2012 | Kihara | ................ | B62D 21/152 | 296/187.09 |
| 8,276,976 B2 * | 10/2012 | Yasuhara | ............. | B62D 21/152 | 296/187.09 |

(Continued)

FOREIGN PATENT DOCUMENTS

| JP | 2009-179301 A | 8/2009 |
|---|---|---|
| JP | 2010-228722 | 10/2010 |
| JP | 2012-180082 A | 9/2012 |

OTHER PUBLICATIONS

Office Action mailed Apr. 5, 2016, in Japanese Patent Application No. 2014-091550.

*Primary Examiner* — Gregory Blankenship
(74) *Attorney, Agent, or Firm* — Oblon, McClelland, Maier & Neustadt, L.L.P.

(57) ABSTRACT

There is provided a vehicle front portion structure including: a front side member including a linear portion that extends along the vehicle front and rear direction on the vehicle width direction outside of the vehicle front portion and is disposed on the vehicle front side of a dash panel, and a slanted portion that extends obliquely downward along an undersurface of the dash panel from a rear end portion of the linear portion; and a side portion weak portion disposed in a vehicle width direction outside surface or a vehicle width direction inside surface of the linear portion along a joint between the linear portion and the slanted portion.

5 Claims, 7 Drawing Sheets

(56) References Cited

U.S. PATENT DOCUMENTS

| Patent/Publication | Date | Inventor | Classification |
|---|---|---|---|
| 8,915,025 B2 * | 12/2014 | Laflamme | B21D 11/02 293/102 |
| 2001/0033094 A1 * | 10/2001 | Sano | B62D 21/152 296/203.02 |
| 2009/0243336 A1 * | 10/2009 | Honji | B62D 21/152 296/187.09 |
| 2010/0026047 A1 * | 2/2010 | Baccouche | B62D 21/152 296/187.09 |
| 2010/0066124 A1 * | 3/2010 | Terada | B62D 21/152 296/187.09 |
| 2011/0272971 A1 * | 11/2011 | Kihara | B62D 25/2018 296/203.02 |
| 2011/0309655 A1 * | 12/2011 | Mori | B62D 21/152 296/187.09 |
| 2012/0049571 A1 * | 3/2012 | Katou | B62D 21/155 296/187.09 |
| 2012/0187719 A1 * | 7/2012 | Fujii | B62D 25/082 296/187.09 |
| 2012/0313398 A1 * | 12/2012 | Shin | B62D 21/152 296/187.1 |
| 2013/0249248 A1 * | 9/2013 | Ohnaka | B62D 21/152 296/203.02 |
| 2014/0167450 A1 * | 6/2014 | Sotoyama | B62D 21/152 296/187.09 |
| 2014/0239671 A1 * | 8/2014 | Mori | F16F 7/12 296/187.09 |
| 2015/0048649 A1 * | 2/2015 | Stojkovic | B62D 21/152 296/187.1 |
| 2015/0151792 A1 * | 6/2015 | Mori | B62D 21/152 296/187.09 |
| 2015/0298742 A1 * | 10/2015 | Ono | B62D 21/11 296/187.09 |
| 2015/0307134 A1 * | 10/2015 | Hirota | B62D 21/152 296/187.09 |

* cited by examiner

VEHICLE FRONT PORTION STRUCTURE

CROSS-REFERENCE TO RELATED APPLICATION

This application is based on and claims priority under 35 USC 119 from Japanese Patent Application No. 2014-091550 filed on Apr. 25, 2014, the disclosure of which is incorporated by reference herein.

BACKGROUND

1. Technical Field

The present invention relates to a vehicle front portion structure.

2. Background Art

Japanese Patent Application Laid-Open (JP-A) No. 2012-180082 discloses a front side member equipped with a linear portion that is disposed on the vehicle front side and a bent portion (slanted portion) that is formed on the rear end portion of the linear portion. Furthermore, in this front side member, the bent portion is annealed to thereby form a weak portion, so that the front side member has a structure where shock during a crash such as during a frontal crash or during an oblique frontal crash is absorbed by the weak portion. Additionally, JP-A No. 2009-179301 discloses a structure where a vertical bead (recessed bead) is formed in a vehicle width direction inside side surface of a front side frame (front side member).

However, in the structure disclosed in JP-A No. 2012-180082, the bent portion is made to serve as a weak portion across its entire periphery, so the bending direction of the front side member is indeterminate. For this reason, there is the potential to not be able to make the front side member laterally bend. Furthermore, even in a case where a vertical bead is formed like in the structure disclosed in JP-A No. 2009-179301, there is room for improvement in order to effectively make the front side member laterally bend during a crash.

SUMMARY

In consideration of the circumstances described above, it is an object of the present invention to obtain a vehicle front portion structure that can effectively make the front side member laterally bend during a crash such as during a frontal crash or during an oblique frontal crash.

A first aspect of the present invention provides a vehicle front portion structure including:
- a front side member including
  - a linear portion that extends along the vehicle front and rear direction on the vehicle width direction outside of the vehicle front portion and is disposed on the vehicle front side of a dash panel, and
  - a slanted portion that extends obliquely downward along an undersurface of the dash panel from a rear end portion of the linear portion; and
- a side portion weak portion disposed in a vehicle width direction outside surface or a vehicle width direction inside surface of the linear portion along a joint between the linear portion and the slanted portion.

In the vehicle front portion structure of the first aspect of the present invention, the front side member is equipped with the linear portion on the vehicle front side of the dash panel and the slanted portion that extends obliquely downward along the undersurface of the dash panel from the rear end portion of the linear portion. Furthermore, the side portion weak portion is disposed in the vehicle width direction outside surface or the vehicle width direction inside surface of the linear portion along the joint between the linear portion and the slanted portion. Here, there is a difference in rigidity in the joint between the linear portion and the slanted portion, so by disposing the side portion weak portion along the joint, the front side member can be effectively made to laterally bend along the joint during a crash such as during a frontal crash or during an oblique frontal crash.

Furthermore, because the side portion weak portion is disposed in the linear portion on the vehicle front side of the dash panel, the front side member can be made to laterally bend on the vehicle front side of the dash panel to absorb shock during a crash.

A second aspect of the present invention provides the vehicle front portion structure of the first aspect, wherein the side portion weak portion is slanted toward the vehicle front side heading from the vehicle upper side toward the vehicle lower side along the joint.

In the vehicle front portion structure of the second aspect of the present invention, the front side member can be made to laterally bend a great extent obliquely downward along the side portion weak portion. Furthermore, from the standpoint of production technology, making the joint slanted makes it easier to join the linear portion and the slanted portion to one another than in a case where the linear portion and the slanted portion are joined to one another in such a way that the joint becomes perpendicular.

A third aspect of the present invention provides the vehicle front portion structure of the first aspect, wherein the side portion weak portion is a recessed bead formed by making the vehicle width direction outside surface of the linear portion inwardly recessed.

In the vehicle front portion structure of the third aspect of the present invention, during a crash the front side member can be made to laterally bend in such a way as to open outward as seen in a plan view starting at the recessed bead formed in the vehicle width direction outside surface of the linear portion.

A fourth aspect of the present invention provides the vehicle front portion structure of the first aspect, wherein an upper portion weak portion is disposed in an upper portion of the linear portion in the region where the side portion weak portion is disposed.

In the vehicle front portion structure of the fourth aspect of the present invention, during a crash the front side member can be made to laterally bend starting at the side portion weak portion, and the upper portion of the front side member can be made to buckle in such a way as to fold downward starting at the upper portion weak portion.

A fifth aspect of the present invention provides the vehicle front portion structure of the fourth aspect, wherein:
- the linear portion includes
  - a flat plate-shaped front side member outer and
  - a cross-sectionally hat-shaped front side member inner having an upper side flange portion and a lower side flange portion that are joined to the front side member outer, and
- the upper portion weak portion includes
  - an indented portion formed by indenting the upper side flange portion of the front side member inner inwardly in the vehicle width direction, and
  - a hole portion formed in an upper surface of the linear portion.

In the vehicle front portion structure of the fifth aspect of the present invention, during a crash the upper surface of the front side member inner can be made to buckle in such a way as to fold downward starting at the indented portion and the hole portion.

A sixth aspect of the present invention provides a vehicle front portion structure including:
a front side member, in which are integrally formed:
   a linear portion that extends along the vehicle front and rear direction on the vehicle width direction outside of the vehicle front portion and is disposed on the vehicle front side of a dash panel and
   a slanted portion that extends obliquely downward along an undersurface of the dash panel from a rear end portion of the linear portion; and
a side portion weak portion disposed in a vehicle width direction outside surface or a vehicle width direction inside surface of the linear portion along a rigidity changing portion set in a connecting section between the linear portion and the slanted portion.

In the vehicle front portion structure of the sixth aspect of the present invention, the linear portion and the slanted portion that configure the front side member are integrally formed. Furthermore, the rigidity changing portion is set in the connecting section between the linear portion and the slanted portion, and the side portion weak portion is disposed along the rigidity changing portion. Because of this, during a crash such as during a frontal crash or during an oblique frontal crash, the front side member can be effectively made to laterally bend along the rigidity changing portion.

As described above, according to the first and sixth aspects of the present invention, the present invention has the superior effect that, during a crash such as during a frontal crash or during an oblique frontal crash, the front side member can be effectively made to laterally bend so that deformation of the cabin can be restrained.

According to the second aspect of the present invention, the present invention has the superior effects that the crash energy can be absorbed more and workability can be improved.

According to the third aspect of the present invention, the present invention has the superior effect that the effect on parts inside the vehicle can be reduced by the laterally bent front side member.

According to the fourth and fifth aspects of the present invention, during a crash the front side member can be made to buckle more stably compared to a configuration where only the side portion weak portion is formed. Furthermore, the invention has the superior effect that, during a crash, the upper surface of the front side member can be kept from entering the dash panel and deforming the cabin.

BRIEF DESCRIPTION OF THE DRAWINGS

An exemplary embodiment of the present invention will be described in detail based on the following figures, wherein.

DETAILED DESCRIPTION

Figure 1:
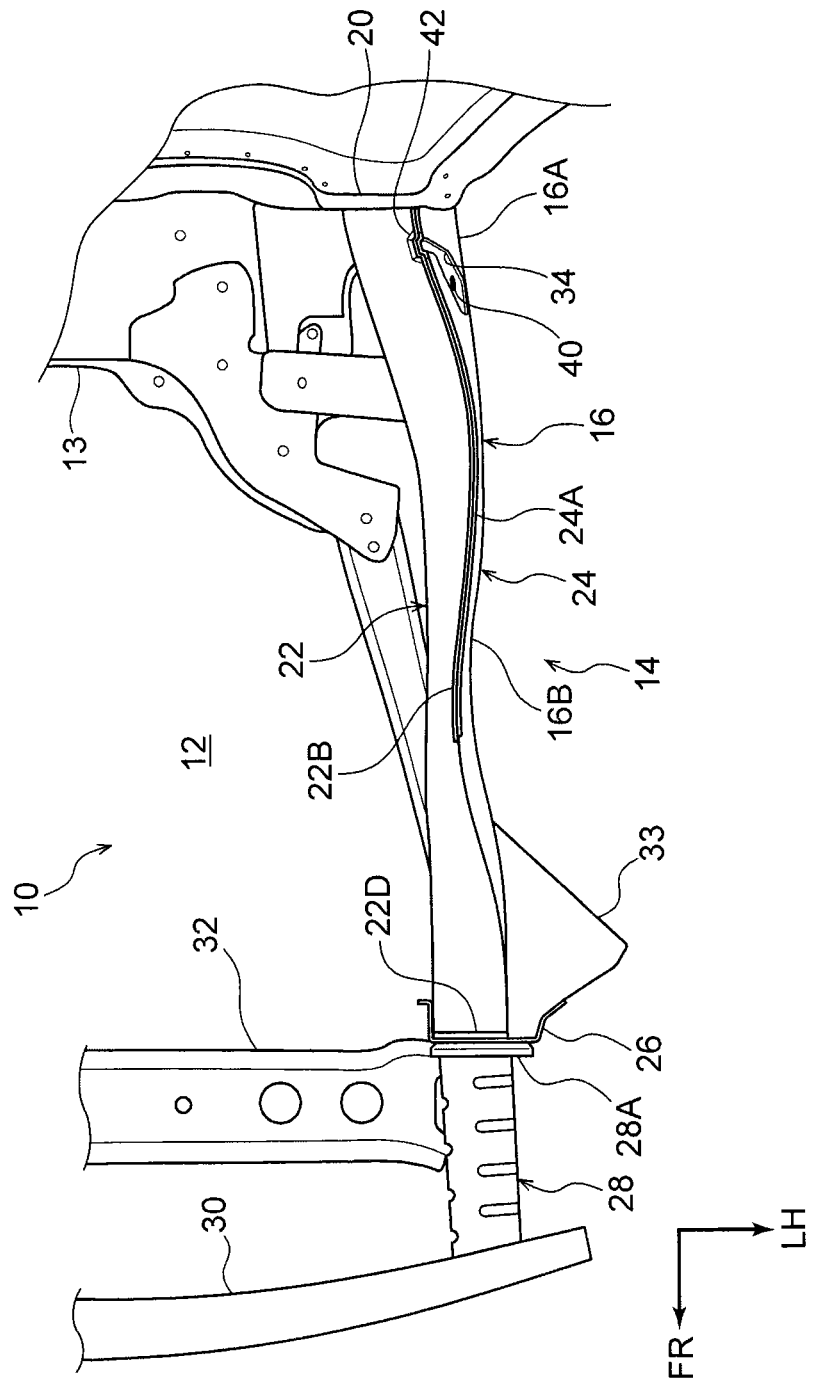
FIG. 1 is a plan view showing a left side section of a vehicle front portion of a vehicle to which a vehicle front portion structure pertaining to the embodiment is applied.

A vehicle front portion structure pertaining to the present invention will be described below on the basis of the drawings. Arrow FR appropriately shown in the drawings indicates a vehicle front side, arrow UP indicates a vehicle upper side, and arrow LH indicates a left side in the vehicle width direction. Furthermore, the vehicle front portion structure pertaining to the present invention is configured to be bilaterally symmetrical in the vehicle width direction. For this reason, the left side section of the vehicle will be described below, and description regarding the right side section of the vehicle will be omitted.

(Vehicle Front Portion Structure)

In FIG. 1, a vehicle front portion of a vehicle 10 equipped with the vehicle front portion structure pertaining to the present embodiment is shown in a plan view. Furthermore, in FIG. 2, a side view of the vehicle front portion of the vehicle 10 as seen from the vehicle left side is shown, and in FIG. 3, a perspective view of the vehicle front portion of the vehicle 10 as seen from outside in the vehicle width direction and obliquely from the vehicle upper side is shown. Moreover, in FIG. 4, a perspective view of the vehicle front portion of the vehicle 10 as seen from inside in the vehicle width direction and obliquely from the vehicle upper side is shown.

As shown in FIG. 1, an engine compartment 12 is formed in the front portion of the vehicle 10 to which the vehicle front portion structure is applied. A non-illustrated power unit configured to include an engine and/or a motor is housed in the engine compartment 12, and a suspension member 13 is disposed under the power unit. Furthermore, a non-illustrated cabin is formed across a dash panel 20 on the vehicle rear side of the suspension member 13. Moreover, a right and left pair of front side members 14 that extend in the vehicle front and rear direction are disposed on both vehicle width direction sides in the lower portion of the engine compartment 12.

Figure 2:
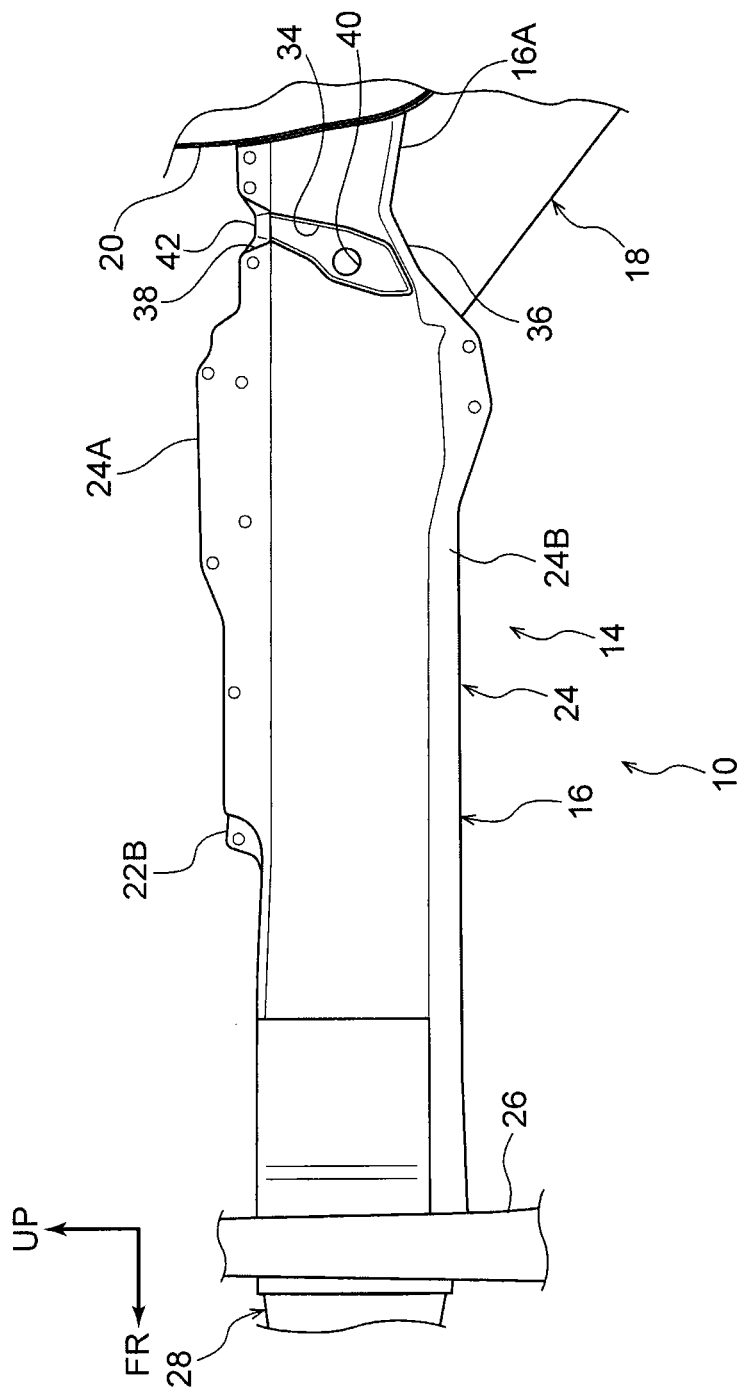
FIG. 2 is a side view showing the vehicle front portion of the vehicle to which the vehicle front portion structure pertaining to the embodiment is applied.

The front side members 14 extend along the vehicle front and rear direction on the vehicle width direction outsides of the vehicle front portion. Furthermore, as shown in FIG. 2, each front side member 14 is equipped with a linear portion 16 that is disposed on the vehicle front side of the dash panel 20 and a slanted portion (kick portion) 18 that extends obliquely downward along the undersurface of the dash panel 20 from a rear end portion 16A of the linear portion 16. Here, when a joint 36 between the linear portion 16 and the slanted portion 18 is seen from the vehicle left side, the front side of the joint 36 is formed in such a way as to slant toward the vehicle front side heading from the vehicle upper side toward the vehicle lower side, and the rear side of the joint 36 is formed in such a way as to gently slant toward the vehicle rear side heading from the vehicle upper side toward the vehicle lower side.

Figure 4:
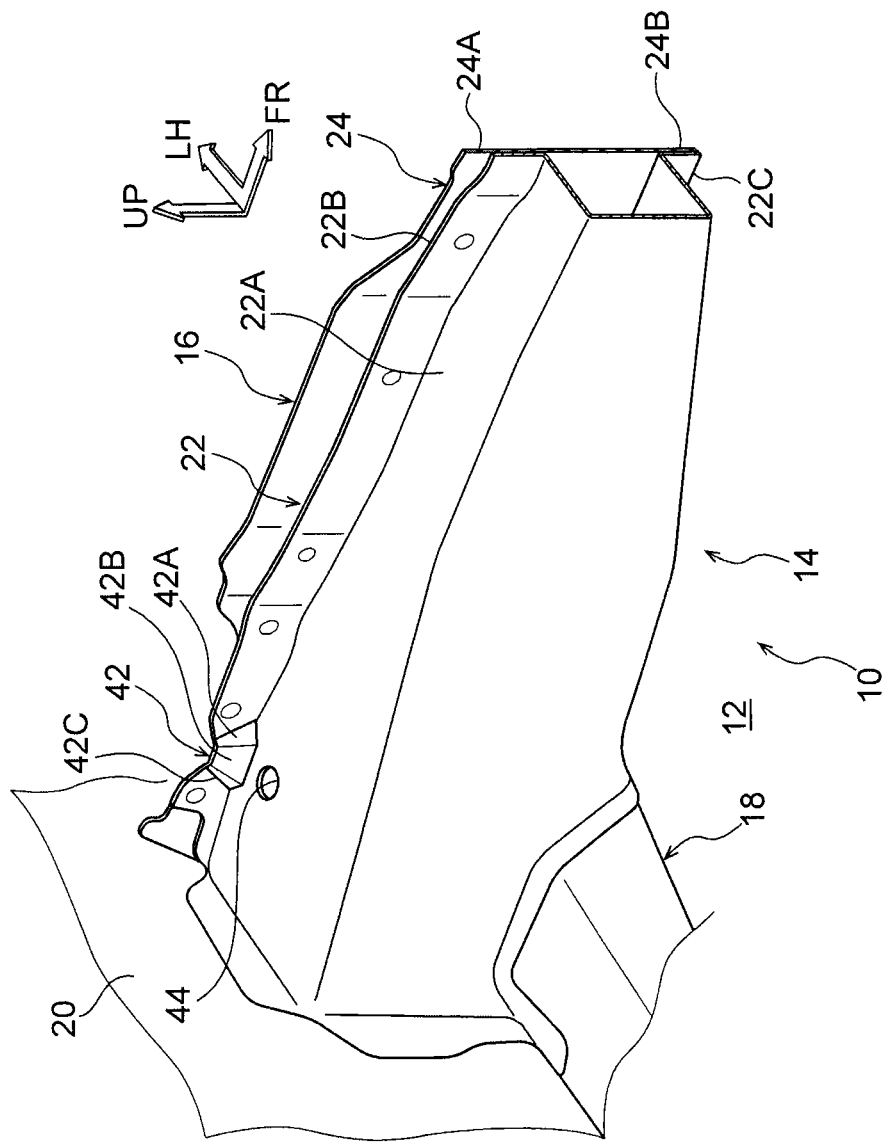
FIG. 4 is a perspective view showing the vehicle front portion of the vehicle to which the vehicle front portion structure pertaining to the embodiment is applied, as seen from inside in the vehicle width direction and obliquely from the vehicle upper side.

Here, as shown in FIG. 1, the vehicle front and rear direction rear end portion 16A of the linear portion 16 of the front side member 14 is positioned on the vehicle width direction inside of a vehicle front and rear direction middle portion 16B of the linear portion 16. That is, the linear portion 16 is slanted inward in the vehicle width direction heading from the vehicle front side toward the vehicle rear side. Furthermore, as shown in FIG. 4, the linear portion 16 is configured to include a front side member outer 24 and a front side member inner 22. The front side member outer 24 is formed in a substantially flat plate shape, and an upper flange portion 24A that extends upward is formed on the upper end portion of the front side member outer 24. Furthermore, a lower side flange portion 24B that extends downward is formed on the lower end portion of the front side member outer 24.

The front side member inner 22 is equipped with a cross-sectionally substantially U-shaped main body portion 22A. Furthermore, the front side member inner 22 is equipped with an upper side flange portion 22B that extends upward from the vehicle left side upper end portion of the main body portion 22A and a lower side flange portion 22C that extends downward from the vehicle left side lower end portion of the main body portion 22A, so that overall the front side member inner 22 has a cross-sectional substantially hat shape that opens outward (the vehicle left side) in the vehicle width direction. Additionally, the upper side flange portion 22B is joined by spot welding, for example, to the upper side flange portion 24A of the front side member outer 24, and the lower side flange portion 22C is joined by spot welding, for example, to the lower side flange portion 24B of the front side member outer 24, so that a closed cross-sectional structure is formed.

As shown in FIG. 1, a front flange 22D that is bent up and down is formed on the front end portion of the front side member inner 22, and a plate-shaped bracket 26 is fastened and bonded to the front flange 22D. Furthermore, a crash box 28 is disposed on the vehicle front side of the bracket 26, and a flange 28A formed on the rear end portion of the crash box 28 is fastened to both the bracket 26 and the front flange 22D by non-illustrated fasteners such as bolts and nuts. Moreover, a bumper reinforcement 30 is secured by fasteners such as bolts and nuts to the front end portion of the crash box 28. Furthermore, a radiator support 32 for supporting a non-illustrated radiator is disposed on the vehicle width direction inside of the crash box 28.

The bumper reinforcement 30 is disposed with its lengthwise direction coinciding with the vehicle width direction in the vehicle body front portion and projects further outward in the vehicle width direction than the crash box 28. Furthermore, a projecting portion 33 that projects outward in the vehicle width direction is disposed on the front end portion of the front side member 14. The projecting portion 33 is formed in a substantially triangular shape as seen in a plan view and projects further outward in the vehicle width direction than the bumper reinforcement 30. A non-illustrated absorber comprising foam, for example, is attached to the front end surface of the bumper reinforcement 30, and the absorber and the bumper reinforcement 30 are covered by a non-illustrated bumper cover, so that a front bumper is formed.

Here, as shown in FIG. 2, a recessed bead 34 that serves as a side portion weak portion is formed in the linear portion 16 of the front side member 14. The recessed bead 34 is formed by making the vehicle width direction outside surface of the linear portion 16 inwardly recessed and is formed slanting toward the vehicle front side heading from the vehicle upper side toward the vehicle lower side along the joint 36 between the linear portion 16 and the slanted portion 18.

Furthermore, the upper end portion of the recessed bead 34 leads to a cutout portion 38 formed in the upper side flange portion 24A of the front side member outer 24, and the lower end portion of the recessed bead 34 extends along the joint 36 from the up and down direction middle portion of the front side member outer 24 as far as the lower side. Moreover, a side portion through hole 40 is formed in the up and down direction middle portion of the recessed bead 34. The side portion through hole 40 is formed in a substantially circular shape as seen in a side view and is formed penetrating the front side member outer 24 in the vehicle width direction.

In the present embodiment, the joint 36 between the linear portion 16 and the slanted portion 18 is slanted toward the vehicle front side heading from the vehicle upper side toward the vehicle lower side, so the recessed bead 34 also slants along the joint 36, but the present invention is not limited to this. That is, if the joint 36 between the linear portion 16 and the slanted portion 18 is set perpendicular relative to the axial direction of the linear portion 16, the recessed bead 34 may also be formed perpendicularly along the joint 36. Furthermore, it is not necessary for the entire recessed bead 34 to be disposed along the joint 36, and it suffices for at least part of the recessed bead 34 to be disposed along the joint 36.

Furthermore, in the present embodiment, the substantially circular side portion through hole 40 is formed in the recessed bead 34, but the present invention is not limited to this. A through hole having another shape may also be formed, such as, for example, a through hole having a substantially rectangular shape or a substantially polygonal shape as seen in a side view. Moreover, plural side portion through holes 40 may also be formed in the recessed bead 34, or conversely the recessed bead 34 may also be given a configuration in which the side portion through hole 40 is not formed in it. Furthermore, it is not invariably necessary to form the side portion through hole 40 so as to penetrate the front side member outer 24.

Figure 3:
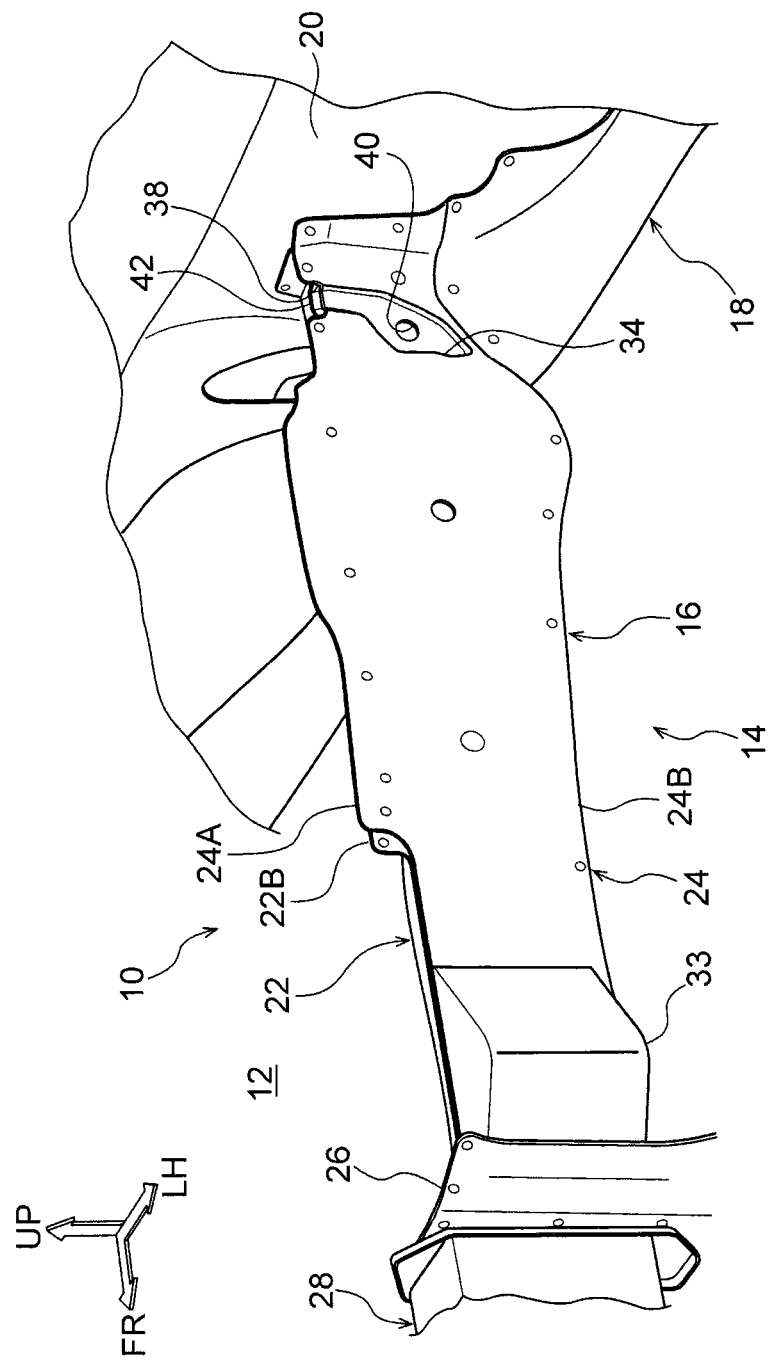
FIG. 3 is a perspective view showing the vehicle front portion of the vehicle to which the vehicle front portion structure pertaining to the embodiment is applied, as seen from outside in the vehicle width direction and obliquely from the vehicle upper side.

As shown in FIG. 4, an upper portion through hole (hole portion) 44 and a joggle (indented portion) 42 that serve as an upper portion weak portion are formed in the front side member inner 22. The upper portion through hole 44 and the joggle 42 are formed in the rear end portion of the front side member inner 22 and, as shown in FIG. 2 and FIG. 3, are formed in the upper portion of the linear portion 16 in the region where the recessed bead 34 is disposed. The "region where the recessed bead 34 is disposed" referred to here is not limited to a region overlapping the recessed bead 34 in the vehicle front and rear direction as seen in a plan view and widely includes regions affected by the deformation of the recessed bead 34 during a crash.

As shown in FIG. 4, the joggle 42 is formed by indenting the upper side flange portion 22B of the front side member inner 22 inwardly in the vehicle width direction. Furthermore, the joggle 42 is configured to include a front side slanted portion 42A that is bent inward in the vehicle width direction from the upper side flange portion 22B, a joggle main body portion 42B that extends toward the vehicle rear side from the rear end portion of the front side slanted portion 42A, and a rear side slanted portion 42C that bends outward in the vehicle width direction from the rear end portion of the joggle main body portion 42B and connects to the upper side flange portion 42B. For this reason, the joggle 42 has a substantially U-shape that opens outward in the vehicle width direction as seen in a plan view. Furthermore, the front side slanted portion 42A, the joggle main body portion 42B, and the rear side slanted portion 42C are all also slanted in such a way that their lower end portions are positioned further inward in the vehicle width direction than their upper end portions.

The joggle 42 is not limited to the shape described above and may also have another shape. For example, the joggle 42 may also be formed in such a way that the upper end portions and the lower end portions of the front side slanted portion 42A, the joggle main body portion 42B, and the rear side slanted portion 42C have the same position in the vehicle width direction. In other words, the joggle 42 may also be formed so as to be perpendicular to the upper surface of the front side member inner 22.

The upper portion through hole 44 is formed in the upper surface of the front side member inner 22. The upper portion through hole 44 is formed in the neighborhood of the joggle 42 and is formed in a substantially circular shape as seen in a plan view. Furthermore, the upper portion through hole 44 is formed penetrating the upper surface of the front side member inner 22 in the up and down direction. The present invention is not limited to this, and the upper portion through hole 44 may also have another shape, such as, for example, a through hole having a substantially rectangular shape or a substantially polygonal shape as seen in a plan view. Moreover, plural upper portion through holes 44 may also be formed in the upper surface of the front side member inner 22. Furthermore, it is not invariably necessary for the upper portion through hole 44 to penetrate the front side member inner 22. For example, the upper surface of the front side member inner 22 may also be formed recessed.

Furthermore, in the present embodiment, the linear portion 16 is configured by the substantially flat plate-shaped front side member outer 24 and the cross-sectionally substantially hat-shaped front side member inner 22, but the present invention is not limited to this. For example, the linear portion 16 may also be configured by forming the front side member outer 24 in a cross-sectional substantially hat shape like the front side member inner 22, bringing the open sides of the front side member outer 24 and the front side member inner 22 into opposition with one another, and joining the front side member outer 24 and the front side member inner 22 to one another. In this case, it suffices for the recessed bead 34 to be formed in the side surface of the front side member outer 24. Furthermore, a through hole that is the same as the upper portion through hole 44 formed in the upper surface of the front side member inner 22 may also be formed in the upper surface of the front side member outer 24.

Moreover, in the present embodiment, the recessed bead 34 is formed as the side portion weak portion, but the present invention is not limited to this. For example, a groove portion or a hole portion may also be formed as the side portion weak portion. Furthermore, the recessed bead 34 is formed in the vehicle width direction outside surface of the linear portion 16, that is to say the front side member outer 24, but the present invention is not limited to this. The recessed bead 34 may also be formed in the vehicle width direction inside surface of the linear portion 16. In this case, for example, the recessed bead 34 may also be formed in the side surface of the front side member inner 22 along the joint 36 between the linear portion 16 and the slanted portion 18.

(Action and Effects)

Next, the action and effects of the embodiment will be described.

Figure 5:
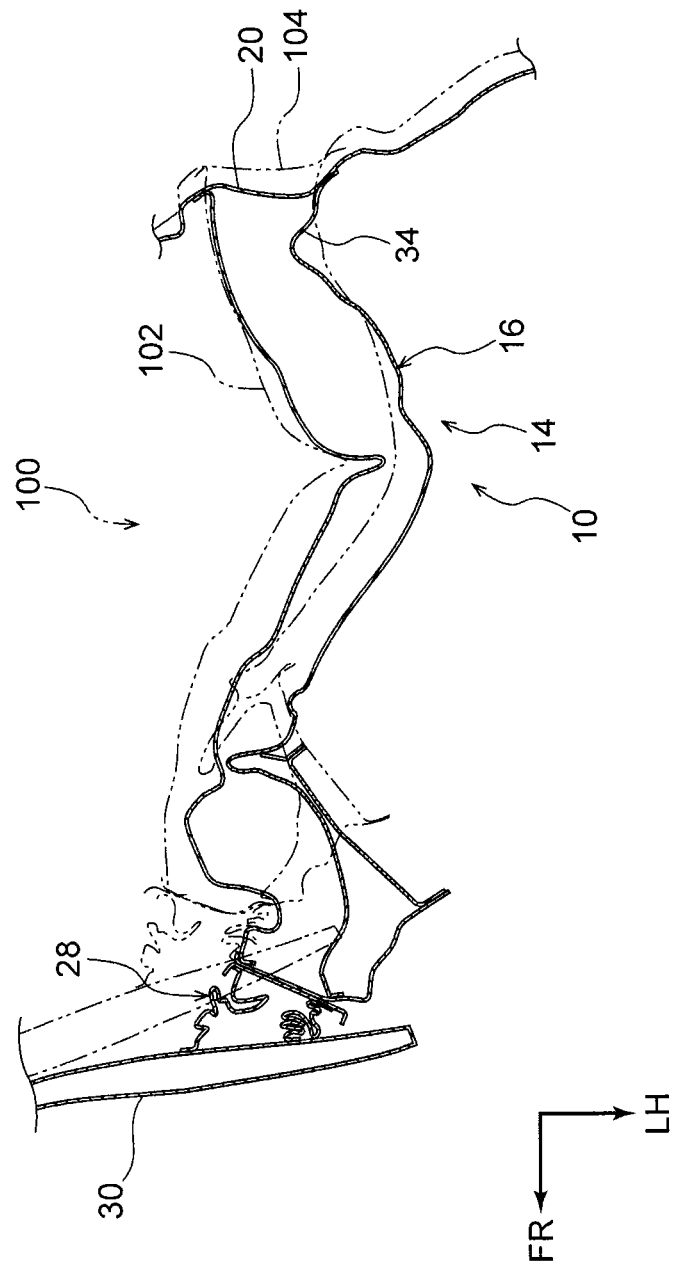
FIG. 5 is a plan sectional view showing a deformed state of the vehicle front portion when the vehicle to which the vehicle front portion structure pertaining to the embodiment is applied has been involved in a crash.

In the present embodiment, during a crash such as during a frontal crash or during an oblique frontal crash, when the crash load is input from the impactor (barrier) to the bumper reinforcement 30 of the vehicle 10, as shown in FIG. 5, the crash box 28 joined to the vehicle rear side of the bumper reinforcement 30 is compressively deformed (crushed), and in accompaniment with this deformation some of the crash energy is absorbed. Furthermore, the remaining crash load is transmitted to the linear portion 16 of the front side member 14.

Here, in the present embodiment, the recessed bead 34 is disposed on the vehicle width direction outside of the linear portion 16, so the front side member 14 (the linear portion 16) can be made to laterally bend on the vehicle front side of the dash panel 20 starting at the recessed bead 34. Because the front side member 14 is made to laterally bend so that the crash energy is absorbed on the vehicle front side of the dash panel 20 in this way, deformation of the cabin can be restrained.

Here, in FIG. 5, the deformed state of a vehicle 100 of a comparative example is indicated by the long dashed double-short dashed line. The vehicle 100 of the comparative example has the same configuration as the vehicle 10 pertaining to the present embodiment except that the recessed bead 34, the side portion through hole 40, the joggle 42, and the upper portion through hole 44 are not formed in it. By comparing the deformed state of a front side member 102 of the vehicle 100 of the comparative example to the deformed state of the front side member 14 pertaining to the present embodiment, it will be understood that the front side member 14 pertaining to the present embodiment is laterally bent a greater extent. That is, in the present embodiment, it can be confirmed that the front side member 14 is effectively laterally bent along the joint 36 between the linear portion 16 and the slanted portion 18 starting at the recessed bead 34.

By effectively making the front side member 14 to laterally bend as described above, deformation toward the vehicle rear side is restrained more in the dash panel 20 pertaining to the present embodiment than in a dash panel 104 of the vehicle 100 of the comparative example. That is, it can be confirmed that deformation of the cabin can be restrained by effectively making the front side member 14 to laterally bend like in the present embodiment.

Figure 6:
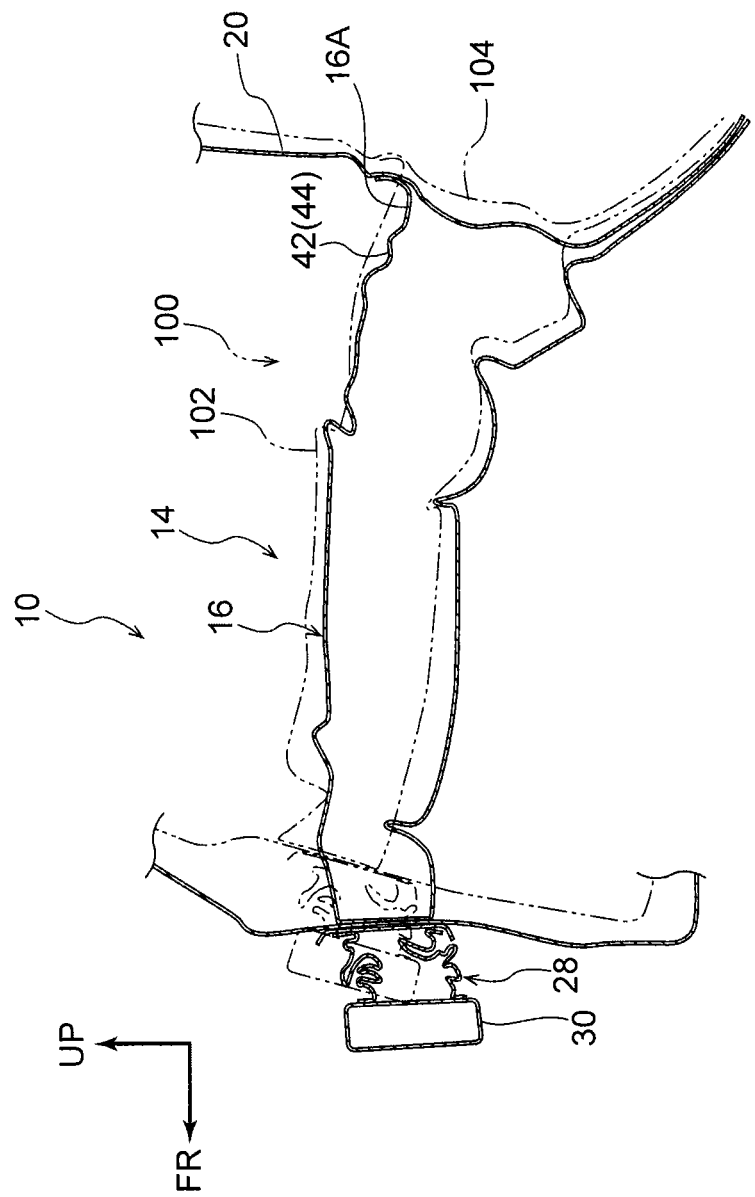
FIG. 6 is a side sectional view showing the deformed state of the vehicle front portion when the vehicle to which the vehicle front portion structure pertaining to the embodiment is applied has been involved in a crash.

As shown in FIG. 6, by comparing the side sectional view of the deformed state of the vehicle 10 of the present embodiment as seen from the vehicle left side to the side sectional view of the deformed state of the vehicle 100 of the comparative example as seen from the vehicle left side, it can be configured that the rear end portion 16A of the linear portion 16 buckles downward more in the present embodiment. That is, in the present embodiment, because the joggle 42 and the upper portion through hole 44 are formed in the rear end portion 16A of the linear portion 16, the upper surface of the linear portion 16 can be made to buckle in such a way as to fold downward, so that the crash energy is effectively absorbed on the front side of the dash panel 20. Because of this, deformation of the cabin can be restrained. In particular, in a case where the upper surface of the front side member inner 22 is disposed as far as the dash panel 20 like in the present embodiment, by disposing a buckling origin in this upper surface, during a crash the upper surface of the front side member inner 22 can be kept from entering the cabin.

Furthermore, in the present embodiment, as shown in FIG. 1, the recessed bead 34 is disposed in the vehicle width direction outside surface of the linear portion 16 of the front side member 14, so during a crash the linear portion 16 can be made to laterally bend outward in the vehicle width direction starting at the recessed bead 34. Because of this, the effect on parts disposed in the engine compartment 12 can be reduced by the laterally bent front side member 14.

Moreover, it is easier for the linear portion 16 of the front side member 14 to laterally bend outward in the vehicle width direction during a crash in a structure where the rear end portion 16A of the linear portion 16 of the front side member 14 is positioned on the vehicle width direction inside of the middle portion 16B like in the present embodiment. For this reason, by disposing the recessed bead 34 in the vehicle width direction outside surface of the linear portion 16, the front side member 14 can be more effectively made to laterally bend, the bending direction can be determined, and the shock absorption performance can be enhanced compared to a case where the recessed bead 34 is disposed on the vehicle width direction inside surface of the linear portion 16.

Incidentally, in the present embodiment, as shown in FIG. 2, the linear portion 16 and the slanted portion 18 of the front side member 14 are joined to one another in such a way that the joint 36 between the linear portion 16 and the slanted portion 18 becomes slanted. Joining the linear portion 16 and the slanted portion 18 to one another in this way makes it easier to join them to one another, and workability can be improved, compared to a case where the linear portion 16 and the slanted portion 18 are joined to one another in such a way that the joint 36 between the linear portion 16 and the slanted portion 18 becomes perpendicular. Additionally, by disposing the recessed bead 34 along the joint 36 in which there is a difference in rigidity, productivity can be improved and at the same time the front side member 14 can be made to laterally bend a great extent.

Figure 7:
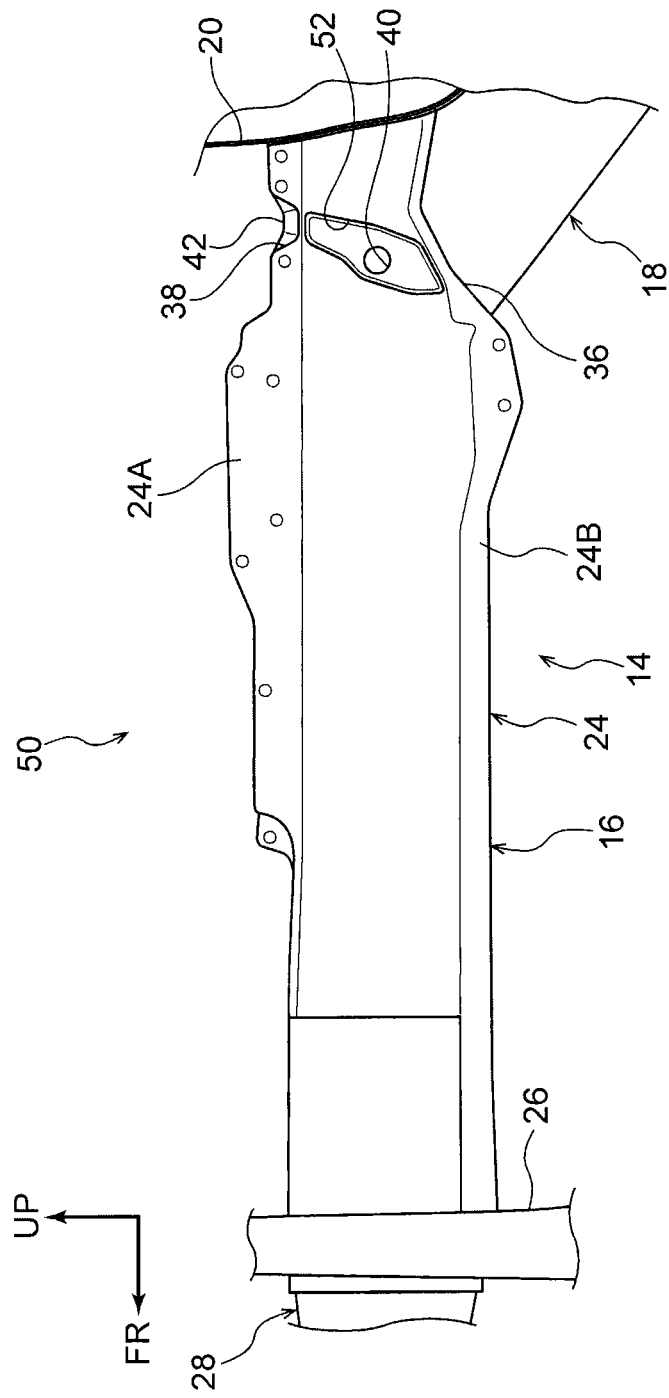
FIG. 7 is a side view showing a vehicle front portion of a vehicle in an example modification of the vehicle front portion structure pertaining to the embodiment.

In the present embodiment, the upper end portion of the recessed bead 34 leads to the cutout portion 38 formed in the upper side flange portion 24A of the front side member outer 24, but the present invention is not limited to this and may also be configured like an example modification shown in FIG. 7. That is, as shown in FIG. 7, in a vehicle 50 to which a vehicle front portion structure pertaining to an example modification of the present embodiment is applied, a recessed bead 52 is formed in the vehicle width direction outside surface of the linear portion 16 of the front side member 14. Here, the lower end portion of the recessed bead 52 is slanted toward the vehicle front side heading from the vehicle upper side toward the vehicle lower side along the joint 36 between the linear portion 16 and the slanted portion 18. Furthermore, the upper end portion of the recessed bead 52 is positioned under the cutout portion 38 formed in the upper side flange portion 24A of the front side member outer 24.

In the vehicle 50 equipped with the vehicle front portion structure pertaining to this example modification also, during a crash the front side member 14 (the linear portion 16) can be effectively made to laterally bend on the vehicle front side of the dash panel 20 starting at the recessed bead 52.

In the vehicle 10 pertaining to the embodiment and the vehicle 50 pertaining to the example modification, the linear portion 16 and the slanted portion 18 of the front side member 14 are separately formed, but the present invention is not limited to this and may also be applied to a front side member 14 in which the linear portion 16 and the slanted portion 18 are integrally formed. In this case, the connecting section between the linear portion 16 and the slanted portion 18 is reinforced by a reinforcement member such as a bulkhead, for example, so that a rigidity changing portion is set in the connecting section. Additionally, by disposing a side portion weak portion such as a recessed bead along the rigidity changing portion, effects that are the same as those of the present embodiment can be achieved.

A vehicle front portion structure pertaining to an embodiment of the present invention has been described above, but the present invention can of course be implemented in a variety of ways without departing from the spirit thereof. For example, in FIG. 2, the cutout portion 38 does not have to be formed in the upper side flange portion 24A of the front side member outer 24, and a joggle that is the same as the one in the upper flange portion 22B of the front side member inner 22 may also be formed. Furthermore, the structure of the present invention may also be disposed in just one of the right and left front side members 14 and does not have to be bilaterally symmetrical.

What is claimed is:

1. A vehicle front portion structure comprising:
   a front side member comprising
      a linear portion that extends along a vehicle front and rear direction on a vehicle width direction outside of a vehicle front portion and is disposed on a vehicle front side of a dash panel, and
      a slanted portion that extends obliquely downward along an undersurface of the dash panel from a rear end portion of the linear portion; and
   a side portion weak portion disposed in a vehicle width direction outside surface or a vehicle width direction inside surface of the linear portion along a joint between the linear portion and the slanted portion,
   wherein the side portion weak portion is slanted toward the vehicle front side heading from a vehicle upper side toward a vehicle lower side along the joint.

2. The vehicle front portion structure of claim 1, wherein the side portion weak portion is a recessed bead formed by making the vehicle width direction outside surface of the linear portion inwardly recessed.

3. The vehicle front portion structure of claim 1, wherein an upper portion weak portion is disposed in an upper portion of the linear portion in a region where the side portion weak portion is disposed.

4. The vehicle front portion structure of claim 3, wherein:
   the linear portion comprises
      a flat plate-shaped front side member outer and
      a cross-sectionally hat-shaped front side member inner having an upper side flange portion and a lower side flange portion that are joined to the front side member outer, and
   the upper portion weak portion comprises
      an indented portion formed by indenting the upper side flange portion of the front side member inner inwardly in the vehicle width direction, and
      a hole portion formed in an upper surface of the linear portion.

5. A vehicle front portion structure comprising:
   a front side member, in which are integrally formed:
      a linear portion that extends along a vehicle front and rear direction on a vehicle width direction outside of a vehicle front portion and is disposed on a vehicle front side of a dash panel and
      a slanted portion that extends obliquely downward along an undersurface of the dash panel from a rear end portion of the linear portion; and
   a side portion weak portion disposed in a vehicle width direction outside surface or a vehicle width direction inside surface of the linear portion along a rigidity changing portion set in a connecting section between the linear portion and the slanted portion,
   wherein the side portion weak portion is slanted toward the vehicle front side heading from a vehicle upper side toward a vehicle lower side along the rigidity changing portion.

* * * * *